March 11, 1941.  S. H. FORSBERG  2,234,238
LUBRICATING FITTING
Filed Dec. 10, 1938
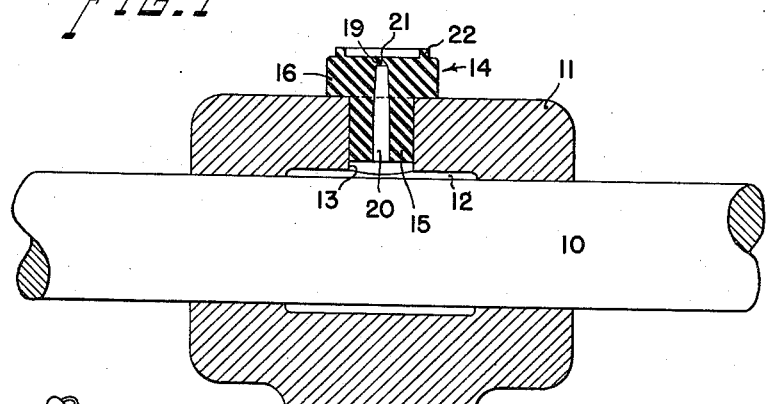
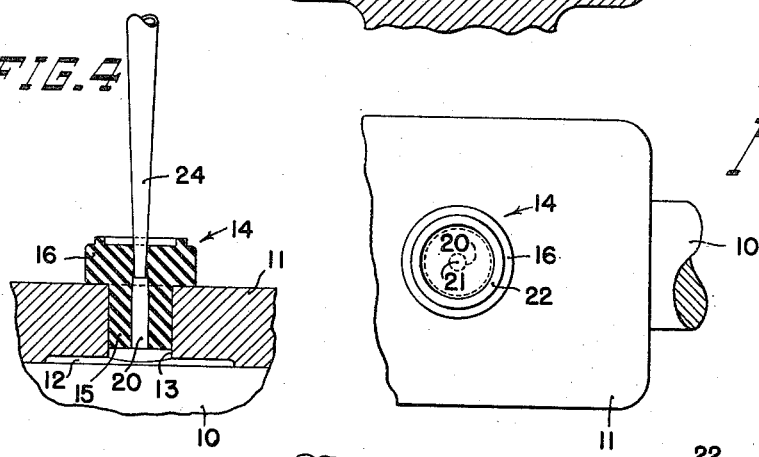
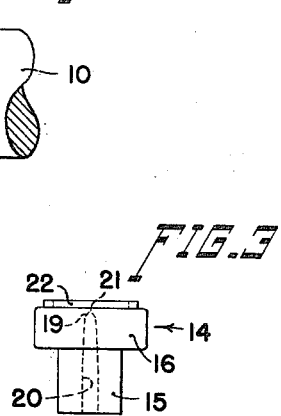
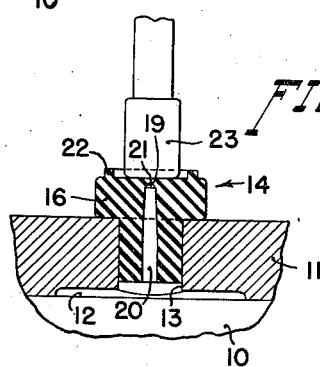
INVENTOR.
SWAN HENRY FORSBERG.
BY
ATTORNEYS Patented Mar. 11, 1941

2,234,238

UNITED STATES PATENT OFFICE 2,234,238

LUBRICATING FITTING

Swan H. Forsberg, Moline, Ill., assignor to Deere & Company, Moline, Ill., a corporation of Illinois Application December 10, 1938, Serial No. 244,993

6 Claims. (Cl. 184—105)

The present invention relates to lubricant fittings and has as its principal object the provision of a new and improved fitting for sealing the oil hole of a bearing and adapted to receive lubricant from the spout of an oil-can or the like.

Another object of the present invention is to provide a fitting that is adapted to receive lubricant from either a spout or grease gun, thereby eliminating the necessity of using one type of fitting for oil and another type for grease.

Still another object is to provide a lubricant fitting that is simple and inexpensive, applicable to most bearing installations, and at the same time requires no special heads or connections on the grease gun or oil-can used to supply the lubricant.

These and other objects and advantages of the present invention will become apparent after a consideration of the following detailed description of a preferred embodiment thereof, reference being had to the appended drawing, in which Figure 1 is a sectional view of a shaft bearing and lubricant fitting embodying the principles of the present invention;

Figure 2 is a fragmentary plan view of the device shown in Figure 1;

Figure 3 is a detail view of the lubricant fitting alone;

Figure 4 is a sectional view showing an oil-can spout inserted into the pin hole of the fitting; and Figure 5 is a view similar to Figure 4 and showing the manner in which a grease gun may be used with the fitting.

Referring now to the drawing, the reference numeral 10 indicates a shaft that is journaled in a bearing 11. In the embodiment shown, the bearing 11 is of the sleeve type, having a shallow annular channel or groove 12 provided in the inner wall thereof for the purpose of holdng lubricant. An oil hole 13 is formed in the bearing 11 opening into the groove 12, and secured in the oil hole 13 is the lubricant fitting, indicated in its entirety by the numeral 14.

The lubricant fitting 14 is made of resilient material, preferably oil-resisting rubber or synthetic rubber which is not affected by oil, and is formed with a barrel or plug portion 15 and a flange or seal portion 16 at one end thereof. An orifice 20 is provided in the center of the fitting 14 and extends upwardly from the lower end of the barrel portion 15, preferably tapering gradually from about midway of its length, then tapering abruptly, as at 19, and terminating in a pin hole 21 disposed centrally in the flange portion 16. As shown in Figure 1, the outer end or face of the barrel portion 15 is flat and the outer end of the pin hole orifice 21 terminates in the plane thereof. Thus, no dirt, caked lubricant, or the like can collect to interfere with the lubricating operation, and being flat, this surface can be readily wiped clean before inserting an oil can spout or other lubricant source. A raised annular ridge 22 is provided on the top surface of the flange portion 16 for the purpose of holding a grease gun head 23 (Figure 5) in register with the pin hole 21 when such a gun is used for injecting grease into the bearing, said ridge serving to prevent the grease gun head from slipping off the fitting.

In the embodiment shown in the drawing, the barrel portion 15 of the fitting is made slightly larger in diameter than the oil hole 13, and is pressed into the hole to form an oil-tight press fit.

To oil the bearing 11, using an oil-can having a spout 24, the spout is pushed through the pin hole 21, spreading the resilient wall of the fitting until the end of the spout extends into the orifice 20, as shown in Figure 4. Oil may then be forced into the oil hole 13 and channel 12 in the usual manner, and when sufficient oil has been applied, the nozzle of the oil-can is withdrawn. The elasticity of the material used in the fitting 14 causes the pin hole 21 to close up again, sealing the oil reservoir 12 against entrance of dirt, water and other foreign matter, and preventing the oil from escaping.

The same fitting may be used with a grease gun for injecting semi-solid grease into the oil hole 13 and groove 12 by pressing the head 23 of the grease gun tightly against the top surface of the flange portion 16 and then operating the mechanism for forcing the grease under pressure through the pin hole 21 and orifice 20. In this instance, the pin hole 21 is expanded by the pressure of the grease in the gun-head, and as soon as the pressure is released the hole closes up, sealing the grease in. As described hereinbefore, the ridge 22 prevents the head of the grease gun from slipping off the fitting, and is particularly advantageous when the fitting has become slippery with grease.

What I claim as my invention is:

1. For use with a bearing having an oil hole therein, a lubricant fitting consisting of a rubber seal portion of larger diameter than said oil hole and adapted to be disposed outwardly thereof so as to cover and overlap the edges of said oil hole, said outer portion of the lubricant fitting having an opening therein adjacent its outer surface that is normally closed by virtue of the elasticity of the rubber, said opening being deformable when an oil can spout is inserted to allow the spout to extend into said oil hole, and means carried by and extending inwardly of said seal portion and fitting tightly within said oil hole for holding said fitting permanently in place on said bearing with said seal portion in position covering said oil hole.

2. For use with a bearing having an oil hole therein, a lubricant fitting adapted to be permanently secured to and form a part of the bearing, consisting of a seal portion of resilient material of larger diameter than said oil hole and adapted to be disposed outwardly thereof so as to cover said oil hole, said outer seal portion having a substantially flat outer face, said outer face having an opening therein that is normally closed by virtue of the elasticity of the resilient material of said outer seal portion, said opening being adapted to open under pressure to allow the passage of lubricant, means extending outwardly from the peripheral portion of said substantially flat surface for holding the head of a grease gun in place on said flat surface and over said opening therein, and means extending generally inwardly from said outer seal portion for permanently fixing said seal portion to said bearing in position covering said oil hole.

3. For use with a bearing having an oil hole, a rubber lubricant fitting adapted to accommodate the head of a grease gun, said fitting comprising a barrel portion adapted to be inserted into said oil hole and having an orifice formed therein, and a flange portion outwardly of said barrel portion and overlapping the edges of the oil hole, said flange portion having a pin hole opening at one end into said orifice and at the other end accessible to a lubricant gun or the like, the rubber of said fitting acting to substantially close said pin hole normally but yielding under pressure of grease from the grease gun to open the pin hole and allow the grease to enter, and a raised annular ridge formed on said flange portion at the outer end of said fitting opposite said barrel portion for holding the head of the grease gun in register with said pin hole.

4. For use with a bearing having a lubricant passage therein, a lubricant fitting comprising a bushing of resilient material, the inner end of which is adapted to be inserted in said passage, there being an inner opening of appreciable diameter extending through said bushing from said inner end toward the outer end terminating short of the latter, said outer end having an opening communicating with said inner opening and of such small diameter as to be normally closed by the resilience of said material so as to prevent dust, dirt and the like from passing into said inner opening, said material being capable of being deformed to allow the passage of lubricant through said normally closed outer opening and into said inner opening to said bearing.

5. A lubricant fitting as defined in claim 4, further characterized by means for limiting the inward movement of the bushing into said lubricant passage so as to dispose the material in which said normally closed opening is formed substantially wholly outside the outer end of said bearing lubricant passage, whereby to facilitate the entrance of a lubricant conduit through said normally closed opening and into said inner opening of appreciable diameter.

6. A lubricant fitting as defined in claim 4, further characterized by said outer end, having the normally closed opening, being substantially flat in the regions surrounding said normally closed opening so as to facilitate wiping off dirt, dust and the like which may collect on the outer end of the bushing between periods of lubrication.

SWAN H. FORSBERG.